United States Patent
Jones

(10) Patent No.: US 9,477,641 B2
(45) Date of Patent: Oct. 25, 2016

(54) CONTINUOUS AIR MONITORS

(75) Inventor: Morgan Jones, Reading (GB)

(73) Assignee: AWE, Reading (GB)

( * ) Notice: Subject to any disclaimer, the term of this patent is extended or adjusted under 35 U.S.C. 154(b) by 737 days.

(21) Appl. No.: 13/810,470

(22) PCT Filed: Jul. 1, 2011

(86) PCT No.: PCT/GB2011/000981
§ 371 (c)(1),
(2), (4) Date: Mar. 4, 2013

(87) PCT Pub. No.: WO2012/007706
PCT Pub. Date: Jan. 19, 2012

(65) Prior Publication Data
US 2013/0158888 A1  Jun. 20, 2013

(30) Foreign Application Priority Data

Jul. 16, 2010 (GB) .................................. 1011982.4

(51) Int. Cl.
*G01T 1/178* (2006.01)
*G06F 17/18* (2006.01)

(52) U.S. Cl.
CPC ............... *G06F 17/18* (2013.01); *G01T 1/178* (2013.01)

(58) Field of Classification Search
CPC ....... G06F 17/18; G06F 17/00; G01T 1/178; G01T 1/16; G01T 1/169; G01T 1/36; G01T 1/38
See application file for complete search history.

(56) References Cited

U.S. PATENT DOCUMENTS

| | | | |
|---|---|---|---|
| 4,888,485 A * | 12/1989 | Becker | G01T 1/178 250/253 |
| 5,124,936 A | 6/1992 | Pelletier et al. | |
| 6,288,400 B1 | 9/2001 | Negro | |
| 6,822,235 B2 * | 11/2004 | Ryden | G01T 1/178 250/336.1 |
| 8,143,584 B2 * | 3/2012 | Burke | G01K 13/00 250/370.02 |
| 2010/0059685 A1 * | 3/2010 | Parkin | 250/395 |

FOREIGN PATENT DOCUMENTS

| | | |
|---|---|---|
| EP | 0473015 A2 | 3/1992 |
| GB | 2428088 A | 1/2007 |
| JP | H11153671 A | 6/1999 |
| JP | 2006126124 A | 5/2006 |

(Continued)

OTHER PUBLICATIONS

Husson et al., AlphaRad, A New Integrated CMOS System-on-Chip for High Efficiency Alpha Particles Counting, 2006, Nuclear Instruments and Methods in Physics Research A 569, pp. 845-852.*

(Continued)

*Primary Examiner* — Toan Le
(74) *Attorney, Agent, or Firm* — Dean W. Russell; Kilpatrick Townsend & Stockton LLP

(57) ABSTRACT

The invention provides for a continuous air monitor for detecting Alpha emitting radionuclides. The monitor measures and records the energy of each detected Alpha count in one of a plurality of channels and compensates for counts due to the presence of Radon. It does this by carrying out a channel by channel statistical test comparing the measured count in each channel to the expected count due to radon daughter products, and determining if any deviation from the expected count is statistically significant.

10 Claims, 4 Drawing Sheets

(56) References Cited

FOREIGN PATENT DOCUMENTS

| JP | 2008511009 A | 4/2008 |
|---|---|---|
| WO | 2006036425 A2 | 4/2006 |

OTHER PUBLICATIONS

Zoghi et al., A Low-Cost Multichannel Analyzer with Data Reduction Assembly for Continuous Air Monitoring System, Apr. 1992, IEEE Transactions on Nuclear Science, vol. 39, No. 2, pp. 299-302.*

Japanese Patent Application No. 2013-519141, Office Action mailed Mar. 3, 2015, 4 pages.
Search Report dated Oct. 15, 2010 in Great Britain Application No. 1011982.4.
Cucchiara et al., "Background Subtraction Adjustment for Plutonium Continuous Alpha Air Monitors Using $^{252}$Cf," Radiation Protection Dosimetry, 11:127-130 (1985).
International Search Report dated Apr. 2, 2012 in Application No. PCT/GB2011/000981.
Search Report dated Oct. 27, 2011 in Great Britain Application No. 1111115.0.

* cited by examiner

Resampling Input Counts to Output Counts

Radon count against energy

Radon count against energy

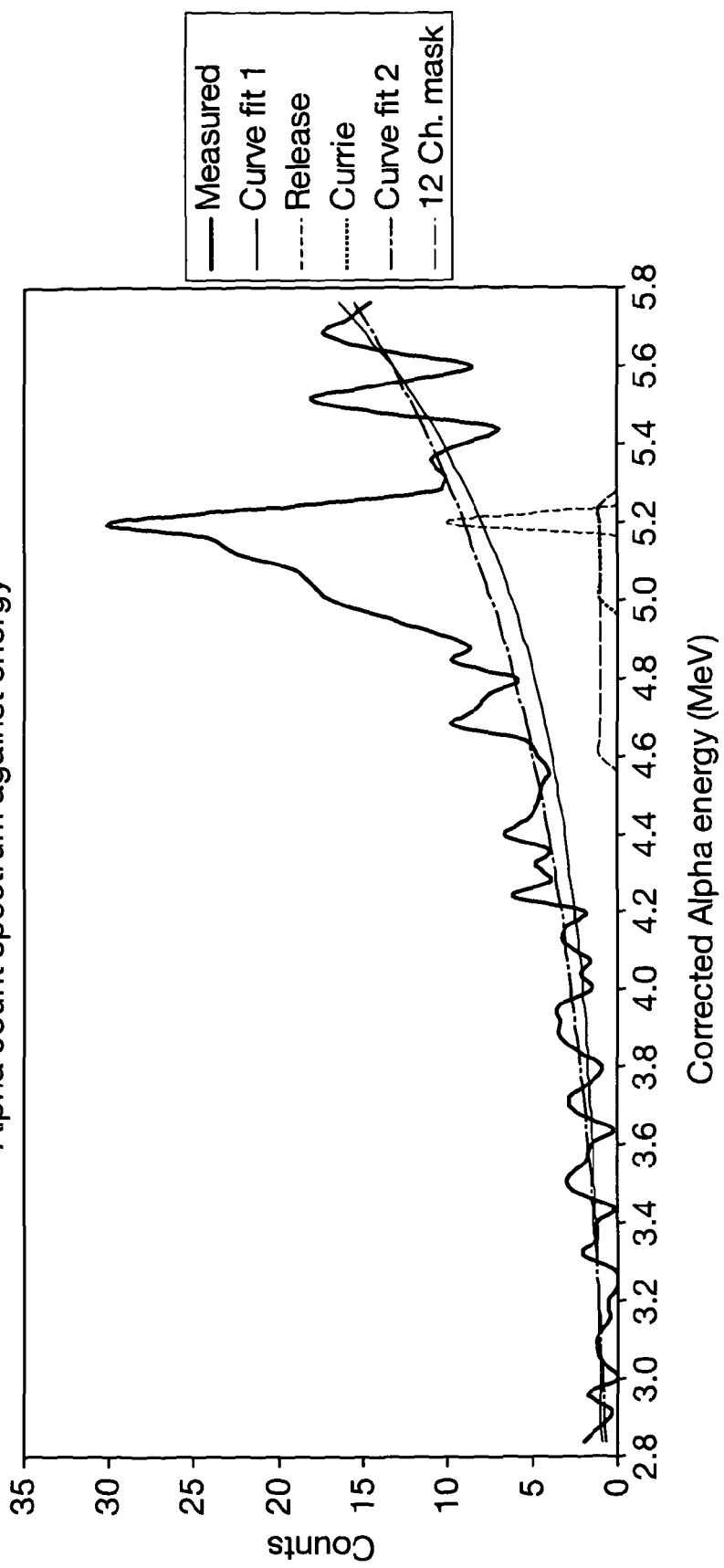

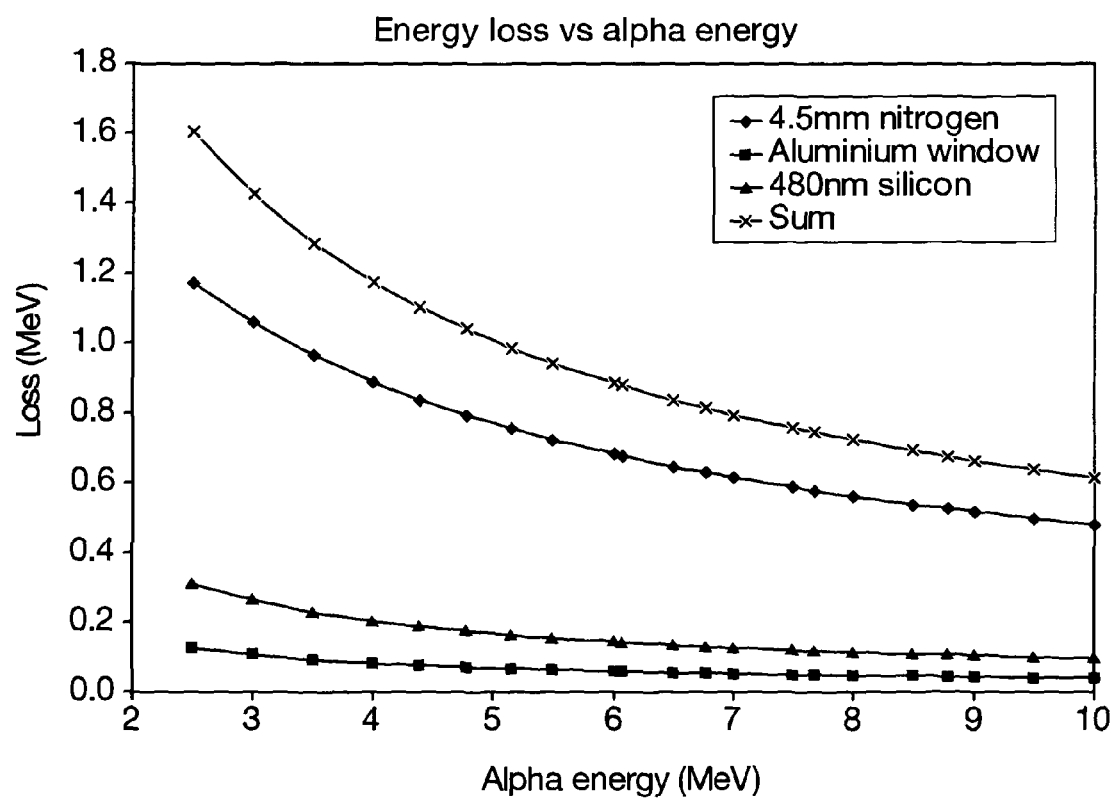

CONTINUOUS AIR MONITORS

CROSS REFERENCE TO RELATED APPLICATIONS

This application is the U.S. national phase of International Application No. PCT/GB2011/000981 filed on Jul. 1, 2011, and published in English on Jan. 19, 2012 as International Publication No. WO2012/007706 A2, which application claims priority to Great Britain Patent Application No. 1011982.4 filed on Jul. 16, 2010, the contents of both of which are incorporated herein by reference.

FIELD OF THE INVENTION

This invention relates to improvements to radiation counting apparatus and applies to instruments capable of collecting a spectrum of counts against detected alpha energy.

BACKGROUND OF THE INVENTION

To accurately record radiation events in a controlled area, it is important for a detector and its associated apparatus to discriminate between radiation events caused by target particles (whose presence the apparatus expects to detect) and those caused by background radiation. In the case of Alpha detection a principal problem is that of Radon emission from the ground and surrounding building materials.

Where an industrial process requires testing for airborne contamination, it is common to employ a Continuous Air Monitor (CAM)

The purpose of a CAM is to detect airborne radioactive dust particles. A pump draws air at a known rate through a filter, thus trapping dust on the filter. A semiconductor detector faces the dust and monitors Alpha activity. Air must be free to flow onto and through the filter, so the detector is forced to measure Alpha activity across an air gap (typically ≈4 mm). Buildings emit Radon gas that decays to solid radioactive daughters which are trapped on the dust filter. It is typical for the total count due to the Radon daughter peaks to be ten or twenty times that of the required detection level of a release peak Thus, all Alpha-in-air monitoring must solve the problem of detecting small quantities of released material against a much larger and varying background.

Of the natural decay series, only two produce Radon gas and are therefore significant to CAMs.

Taking the $^{232}$Th series first:

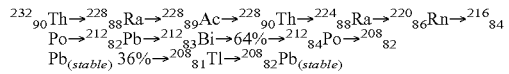

The first solid daughter $^{216}$Po has such a short half-life (0.16 s) that it is unlikely to be trapped and detected on the filter card, so the Alpha CAM $^{232}$Th series starts with $^{212}$Bi which splits to decay via either $^{212}$Po (8.78 MeV) or $^{208}$Tl (6.08 MeV) to $^{208}$Pb.

The other significant series is $^{238}$U:

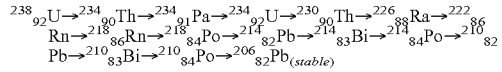

The Alpha CAM $^{238}$U series begins with $^{218}$Po because it is the first solid daughter from the $^{222}$Rn gas, but $^{218}$Po emits 6 MeV Alphas that are almost indistinguishable from the $^{208}$Tl 6.08 MeV peak. Thus, the only clearly distinguishable Alpha seen from the $^{238}$U series is from $^{214}$Po (7.69 MeV). As far as a CAM is concerned, the series stops at $^{210}$Pb (22.3 year half-life), so the 5.3 MeV Alpha from $^{210}$Po is not seen.

Thus, an Alpha CAM must detect releases in the presence of three natural Radon decay daughter peaks at:

6.0/6.08 MeV
7.69 MeV
8.78 MeV

Alphas leaving the filter are forced to travel across an air gap before reaching the detector and this causes each detected Alpha peak to acquire a low energy tail having a shape dominated by the geometry of the air gap, detector, and filter.

The three Radon Alpha peaks previously referred to are usually rejected by a curve fitting and subtraction process. A best-fit curve (usually a form of exponential $e^{nx}$) is fitted to each Radon peak, then this best-fit curve is subtracted from the measured spectrum. The process is usually carried out sequentially, starting with the highest Radon peak because the low energy tail of the 8.78 MeV peak still has significant counts below the 6.08 MeV peak and its tail.

The most accurate curve fit uses the "least squares" technique because this minimises chi squared, but the technique quickly becomes computationally intensive, which may have consequences for demonstrating system robustness in a safety case.

Because radiation is a statistical process, even a perfect subtraction must leave residual deviations about zero, even in the absence of any non-Radon activity. Because the subtraction causes some negative and some positive counts, a summation of the residual counts resulting from a perfect subtraction tends towards zero except where there has been a reading from an incident that is non-Radon dependent.

Although the Radon subtraction process described above is statistically valid, the assumption that any non-zero summation of the resulting residual can only be due to a non-Radon radioactive release may not necessarily valid. Investigated false alarms have been attributed (but not limited) to; xenon strobe lights, gamma rays, electro-magnetic interference, acoustic noise, abrupt changes in Radon concentration.

Release detection has two conflicting requirements:

Firstly, release detection should occur at an air activity that is As Low As Reasonably Practicable (ALARP) in order to minimise a worker's received dose.

Secondly, a false alarm could result in an entire building being evacuated and not being reoccupied until the area monitored by the instrument had been declared safe. False alarms are therefore expensive. Worse, false alarms diminish confidence in the system, possibly causing a true alarm to be ignored.

Release detection therefore has to strike a balance between the increasing probability of false alarms against the minimum detectable level.

Generally an organization's statutory Radiation Protection Adviser wants to maximise safety by driving alarm levels down, but facility managers must minimise lost time due to false alarms, which tends to drive alarm levels up. The two opposing forces therefore tend to an equilibrium whereby an alarm level is chosen that is as low as possible without causing an unacceptable number of false alarms—such a level is commonly known as ALARP. Unfortunately, this implies that the ALARP alarm level for each instrument must be found by trial and error in each facility. In practice, this level of detail is not practicable, and all instruments in a given facility are more likely to have their alarm levels determined by the single instrument that produces the most false alarms. This implies that all the other instruments have their alarm levels set too high.

SUMMARY OF THE INVENTION

The principal aims of the invention are to simplify and minimise both hardware and software making it easier to demonstrate robustness in a safety case, and to reduce the number of false alarms at a detector.

Accordingly the present invention provides for a continuous air monitor for detecting Alpha emitting radionuclides wherein the monitor measures and records the energy of each detected Alpha count in one of a plurality of channels and compensates for counts due to the presence of Radon by carrying out a channel by channel statistical test comparing the measured count in each channel to the expected count due to radon daughter products, and determining if any deviation from the expected count is statistically significant.

Releases are detected as anomalies from the Radon curve fit by a statistical technique rather than sequential subtraction leading to a summed residual as in the prior art.

Because of this the CAM can now operate at a fixed probability of false alarm. This means that it always operates an ALARP level despite changing Radon concentrations.

An advantage of this is that it is no longer necessary to empirically set alarm levels for each and every CAM in each and every location. This leads to a greatly increased immunity to false alarms.

Because the detection technique is more sophisticated than prior art, the preceding Radon curve fitting and subtraction need not be ideal, just "good enough" not to significantly worsen the uncertainties caused by the small counts typically encountered by continuous air monitors a simplified curve fit reduces the number and complexity of software calculations.

The inevitable air gap between filter and detector causes the Alpha energy spectrum deposited in the detector to be nonlinearly distorted. It is advantageous to correct for this nonlinear distortion. Compensating for the loss across the air gap not only restores the detected peak energies to their theoretical energies, but it allows each low energy tail to be fitted with a scaled $e^{nx}$ equation each having the same value of "n". Not only does reducing multiple values of "n" reduce calculation and simplify software, but it also becomes possible to discard calculations that would have been necessary in the prior art. Compensation is carried out by applying the Bethe-Bloch equation to the thickness of the air gap.

In carrying out this compensation, interpretation by the user is cased because there is now a linear relationship between channel number and Alpha energy emitted from the filter—it becomes possible to directly scale the resultant energy spectrum in terms of emitted energies that can be correlated with published energies, enabling quick identification of actinides.

As noted above, it becomes possible to fit all three Radon curves with scaled multiples of the same exponential ($e^{nx}$)— "n" is the same for all three curves.

It is often advantageous to restrict the range of monitoring. This might be for example in a Uranium plant where there are no other Actinide isotopes present in the process. This means that the higher energies can be disregarded (as can lower energies e.g. below 3 MeV). If monitoring is only required over a restricted range of energies, because all three curves use the same exponential, it is no longer necessary to fit radon curves beyond the range of interest, reducing the number of software calculations required.

To further increase the effectiveness of the technique, spectra are collected at fixed count intervals rather than fixed time intervals. This makes computing simpler since as each spectrum has a known total count, the range of numbers needing to be manipulated is restricted. This also means that less memory needs to be used by a system. In a steady state with no events there is no requirement to record and store unchanging spectra. Conversely, during an event where counts may change rapidly, data is not missed because too much comes in during the time interval.

Working to a fixed count rather than a fixed time also means that Lowest Detectable Activity (LDA) becomes directly proportional to radon concentration, rather than its square root, increasing sensitivity in artificially lowered backgrounds such as may be found in sealed and controlled areas.

Additionally there is no time-dependent cross-spectrum analysis necessary. All analysis is performed on a single spectrum resulting in greatly improved immunity to false alarms caused by rapidly changing radon concentrations.

BRIEF DESCRIPTION OF THE DRAWINGS

The invention will now be described by reference to the following drawings and figures FIG. 4 shows Detection of an anomaly FIG. 5 shows Energy loss against emitted alpha energy for CAM2's air gap and detector

DETAILED DESCRIPTION

Figure 1:
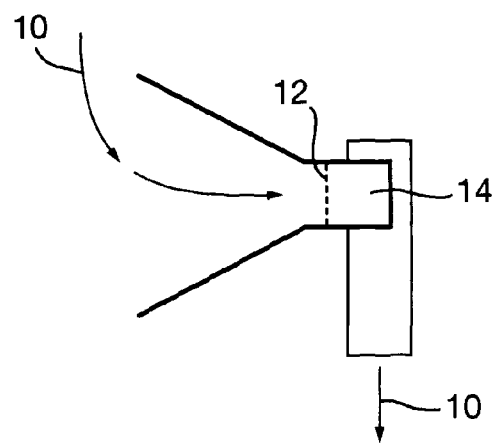
FIG. 1 shows a typical CAM set up
Figure 6:
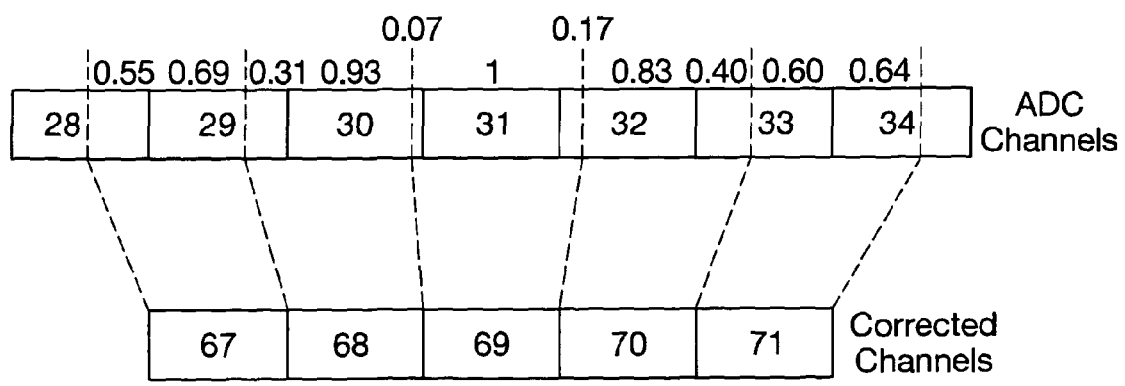
FIG. 6 shows a table of deposited energies through an air gap
Figure 2:
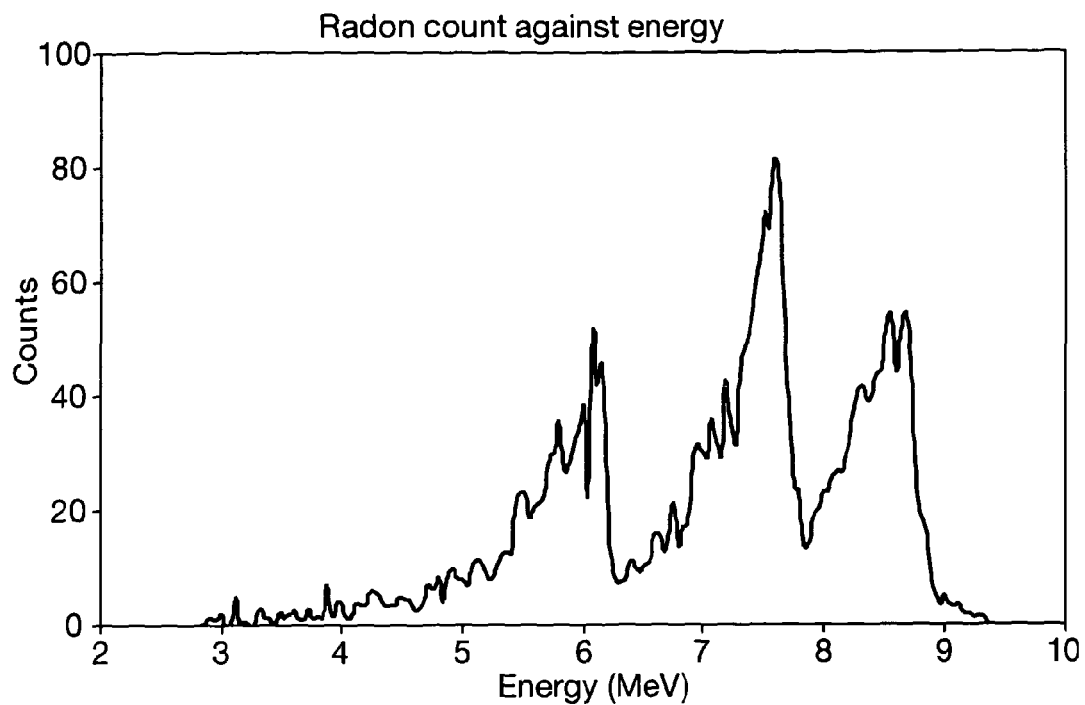
FIG. 2 shows Typical measured Radon Alpha spectrum
Figure 3:
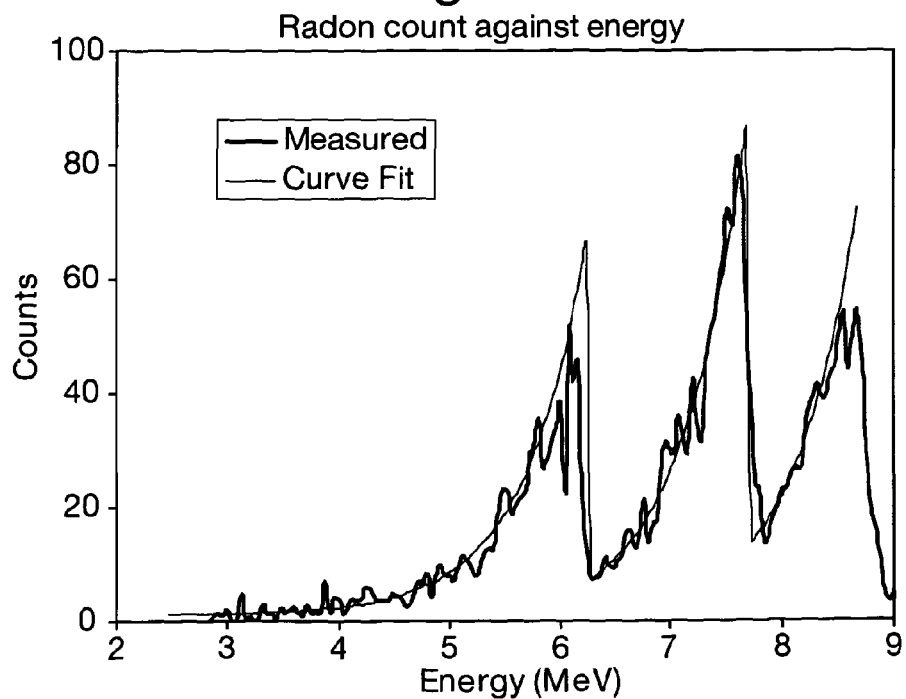
FIG. 3 shows measured Radon Alpha spectrum plus curve fit

FIG. 1 shows a typical detector. Air is drawn (10) by a pump through a porous screen (12). Actinides in dust are deposited on the screen and are detected at the detector (14). Because the air gap attenuates the energies the highest reading equating to the shortest path, the detector records a spectrum for a given particle, with its peak at the highest energy.

In the presence of Radon, any decay that leads to a solid being produced may cause a decay that is not attributable to process-created particulates, and as identified above, a detector records a characteristic set of three peaks due to Radon that need to be eliminated from consideration if a leak is to be detected.

The apparatus according to the invention detects releases by testing each of the 66 channels between 3.20 MeV and 5.80 MeV individually to see if the measured count is statistically significant compared to the curve fitted Radon count. Because the curve fitted count is the interpolated Radon background, subtracting this value from the measured count in any channel gives the Net Count of any release count in that channel. Each Net Count is tested for statistical significance using the Currie critical limit test. As an example:

"A Net Count is deemed statistically significant if it is greater than 1.645 times the square root of twice the interpolated background in that channel."

A Currie coefficient of 1.645 gives a probability p=0.05 (or 1 in 20 chance) that the Net Count in a given channel is beyond normal statistical variation.

In a CAM, any actinide's energy peak has an associated low energy tail due to the multiplicity of paths and Alpha energy losses through the air gap. If the detection apparatus looks for anomalies in adjacent channels as would be characteristic of an actinide, rather than randomly dispersed anomalies over a number of channels, then the overall detection can be considerably improved over what is achievable by the prior art.

The probability of a single group of "m" adjacent channels simultaneously violating the Currie limit as a result of random variation is:

$$P = p^m$$

Where:
p=probability of single channel violation (0.05 for this example)
m=number of channels in group (5 for the apparatus according to this invention)

But the apparatus according to the invention performs a rolling test whereby it sweeps a group of "m" channels across the entire "n" channels, so it performs a total of (n−m) tests, increasing the probability of five adjacent Currie violations caused by a random variation to:

$$P = (n-m)p^m$$

Where:
n=total number of channels (66 in this example)

Using the final equation, the rolling five adjacent channel violation test changes the single channel probability that a detected anomaly is due to normal statistical variation from 1 in 20 to 1 in≈52,459, and this value can be adjusted as required by choosing appropriate values of p, m, and n.

The mechanics of the process within the apparatus according to the invention are that as the channel by channel Net Counts are statistically tested, those that are deemed significant store a value of "1" as a Currie violation flag. Simultaneous with the individual channel tests, an "m" channel rolling addition of Currie violation flags is also performed to search for "m" adjacent channels being violated. If a rolling total of "m" Currie violation flags occurs, a valid anomaly has been found, and the upper energy of the group is deemed to be the peak energy of the Alpha release.

Because release detection is performed by a statistical comparison of the interpolated radon spectrum with the measured spectrum rather than a simple subtraction, the system operates with a fixed probability of false alarm and each instrument continuously adapts to changing circumstances to operate at an ALARP level.

It will be noted from FIG. 4 that two curve fits were used. The first curve fit uses a default value of exponential and performs Currie tests to determine whether data within the 3.2 MeV to 5.8 MeV region may include an actual or impending release. If two adjacent Currie violations are found, all twelve channels from the highest of the two adjacent violations are excluded from the test that selects the optimum value of exponential for the second curve fit. It is the second curve fit that is used as the interpolated Radon background.

Air Gap Compensation:

Before it can be detected, an alpha particle leaving the dust on the filter must first traverse the ≈4 mm air gap, the light-tight aluminium window on the face of the detector, and the silicon dead layer. Each of these layers attenuates the alpha particle's energy in a nonlinear fashion (Bragg curve). Alpha energy loss traversing a layer can be estimated using the Bethe-Bloch equation:

$$-\frac{dE}{dx} = \left(\frac{zq_c^2}{4\pi\varepsilon_0}\right)^2 \cdot \frac{4\pi Z\rho N_A}{Am_c v^2}\left[\ln\left(\frac{2m_c v^2}{I}\right) - \ln(1-\beta^2) - \beta^2\right]$$

Where:

$-\frac{dE}{dx}$ = rate of energy loss with distance (J/m)

z=ratio of ion charge to electron charge (z=2 for an alpha)
$q_e$=charge on electron (≈1.602×10⁻¹⁹ C)
$\varepsilon_0$=permittivity of free space (≈8.854×10⁻¹² F/m)
A=atomic number of material being traversed
Z=mass number of material being traversed
ρ=density of material being traversed (kg/m³)
$N_A$=Avogadro's Number (≈6.022×10²⁶ in SI units)
$m_e$=mass of electron (≈9.109×10⁻³¹ kg)
v=ion entry velocity
c=velocity of light (≈2.998×10⁸ m/s)
β=v/c The ion entry velocity "v" in m/s required by the Bethe-Bloch equation can be derived from its energy in MeV using the Lorentz equation:

$$v = c \cdot \sqrt{1 - \frac{1}{1 + \frac{10^6 q_c E_{(MeV)}}{m_{ion}c^2}}}$$

Where:
v=velocity (m/s)
c=velocity of light (≈2.998×10⁸ m/s)
$q_e$=charge on electron (≈1.602×10⁻¹⁹ C)
$E_{MeV}$=ion energy in MeV
$m_{ion}$=mass of ion (≈6.695×10⁻²⁷ kg for alpha)

Although the loss across the air gap is the dominant loss, an alpha particle in a CAM leaving the filter to be detected by the detector must traverse three distinct layers:

Air gap (typically 4.5 mm, can be reasonably approximated as nitrogen)
Detector's light-tight window (typically 200 µm aluminium)
Detector's dead layer (typically 500 µm silicon)

These layers must be modelled sequentially with the Bethe-Bloch equation being applied appropriately to each because rate of energy loss is dependent on entry energy. It is assumed that alphas only take the normal path through the material (this is true for those alphas that produce the peak channel count in a peak), so the rate of energy loss is calculated over the thickness of the layer. As an example, a 5 MeV alpha might traverse the 4.5 mm air layer and suffer a loss of 750 keV, exiting with an energy of 4.25 MeV. The alpha then enters the aluminium layer with an energy of 4.25 MeV and suffers a loss of 80 keV traversing 200 µm, exiting with an energy of 4.17 MeV. Finally, the alpha enters the silicon dead layer with an energy of 4.17 MeV and suffers a loss of 190 keV traversing 500 µm, exiting with an energy of 3.98 MeV. These sequential calculations must be done for the entire expected spectrum of entry energies.

FIG. 5 shows that although the air gap dominates, detector losses cannot be ignored. Although the previous concatenation of three Bethe-Bloch equations is extremely cumbersome, once calculated, a graph of initial alpha energy leaving the filter against energy detected by the detector can be plotted and curve fitted to produce a much simpler correction equation relating the two energies. For the apparatus according to the invention, the equation was:

$$E_e = 0.01142E_d^2 + 0.78136E_d + 1.63506$$

Where:
$E_e$=emitted energy from the filter in MeV
$E_d$=deposited energy in the detector in MeV This quadratic correction equation could be implemented in the analogue domain before the ADC, but drift would always be a problem.

The most stable solution is to resample the energy bins of the deposited spectrum in the detector into the bins of the required spectrum emitted from the filter. Typical CAMs split the spectrum from 0 MeV to 10 MeV into 250 channels, so each channel is 40 keV wide. Thus, the transition between Ch0 and Ch1 occurs at 40 keV, between Ch1 and Ch2 at 80 keV, and so on. Thus, all the transitions for one spectrum can be calculated for the other spectrum, leading to a nonlinear look-up table that determines which counts go where.

Within a CAM, calculations are based on channel numbers rather than energies. As an example of an individual channel calculation using the look-up table, output channel 69 has integer values for its upper and lower bounds at 69.00 and 70.00, but the deposited energy destined for that channel begins at ADC channel 30.93 and ends at ADC channel 32.17.

The count to be allocated to output channel 69 is found as follows:

Count taken from input channel 30=(31−30.93)×count in channel 30

Count taken from input channel 31=total count in channel 31

Count taken from input channel 32=(32.17−32)×count in channel 32

The example shows that each output channel (emitted spectrum from filter) is the sum of three pre-calculated proportions of three specified ADC channels (deposited spectrum in detector). Each time the spectrum is updated, the resampling process using the look-up table is applied sequentially to each of the required output channels until a full air gap compensated spectrum has been built up. Although this means that there could be as many as 256 channel calculations, each is very simple, so the process is fast.

As has been shown by the previous equations, the energy loss suffered by an Alpha particle is nonlinear with respect to energy. The significance of this is that an Alpha particle with an energy of 3 MeV suffers more energy loss than a particle with an energy of 7 MeV, and therefore the low energy tail of the 7.68 MeV Radon daughter peak has a different shape to that of the 6.08 MeV Radon daughter peak, and when curve fitted with an equation of the form of $e^{nx}$ a different value of "n" is required for each Radon daughter peak.

Thus, compensating for the loss across the air gap not only restores the detected peak energies to their theoretical energies, but it allows each low energy tail to be fitted with a scaled $e^{nx}$ equation each having the same value of "n". Not only does reducing multiple values of "n" reduce calculation and simplify software, but it also becomes possible to discard calculations that were necessary in the prior art.

Because the observed 6.08 MeV Radon peak sits on the low energy tails of both the 7.68 MeV and 8.78 MeV peaks, it was necessary in the prior art to fit all three peaks to obtain a precise curve subtraction. However, in the new invention, the 6.08 MeV curve becomes a summation of different scalings of the same exponential curve and can therefore be fitted directly—it is no longer necessary to explicitly fit the higher energy curves. Thus, if it is only necessary to search for actinides over a restricted range (perhaps 3.2 MeV to 5.8 MeV), the number and complexity of curve fitting calculations can be considerably reduced by only fitting Radon curves as high as 5.8 MeV, further reducing calculation.

Counts leaving the detector have their energies sorted into bins where they are stored and counted. In this way, a count against energy spectrum is built up for later analysis. It will be apparent to the skilled practitioner of the art that the way in which the spectrum is updated by adding data to refresh it and removing obsolete data is key to minimising the LDA.

Prior art wrote spectra at fixed time intervals and used a multiplicity of time ranges across stored spectra to analyse short-term events, medium term events, and chronic events.

In the present invention, the apparatus uses a rolling drum memory of thirty spectra maintained at a fixed integrated count by updating spectra at fixed count intervals. At each update the oldest of the thirty spectra is deleted and replaced by the newest. In this way, a fixed number of new counts are added and the same number of obsolete counts are subtracted.

Because the spectrum to be analysed contains a fixed number of counts regardless of radon concentration, the range of numbers is restricted, making it easier to implement scaled integer arithmetic. Thus, software is simplified.

Because the spectra are updated at constant count intervals, memory is used at maximum efficiency because data collection and storage exactly matches data production. Memory optimisation is significant because the service life of CAMs is typically twenty years, requiring memory that will tolerate many read/write cycles. Although the type of memory used in memory sticks is cheap, it will not tolerate the required number of read/write cycles. Either memory that can tolerate the required number of read/write cycles is required (extra cost), or memory management of larger lower quality memory is required to ensure that each area of the memory is only used a safe number of cycles (extra software complexity). Thus, minimising the amount of required memory is important.

In a building with a low radon count, the apparatus according to the invention would accumulate radon spectra quite slowly, whereas in another building it might collect ten times as fast, but the two integrated spectra would be very similar. However, if there were to be a sudden high activity release, the apparatus according to the invention would collect as many spectra as necessary, allowing detailed post-event analysis. In both cases, the time stamp associated with each spectrum enables time-dependent calculations.

A conventional CAM that generates spectra at fixed time intervals has an LDA that is inversely proportional to the square root of the background activity and this follows directly from the fact that the standard deviation of a normal distribution is equal to its square root. Effectively, an apparatus can detect anomalies once they are beyond some multiple of the background's standard deviation.

Because the apparatus according to the invention works with a fixed spectrum size, it tends to detect anomalies at a fixed number of counts. But because that fixed data set was taken over a variable time inversely proportional to background activity, it follows that apparatus according to the invention has an LDA that is directly proportional to background activity, rather than its square root. In practical terms, this means that in a low background environment, the apparatus according to the invention's algorithm operating on fixed count interval spectra will be more sensitive than one operating on fixed time interval spectra. Statistical laws are not being cheated—the improvement in a low background environment is paid for by poorer performance in a high background.

Because analysis is performed on the single updated spectrum only, rather than the prior art of looking across multiple spectra, sudden changes of radon concentration are ignored. Sudden changes of radon concentration due to opening doors are a well-known cause of false alarms.

The invention claimed is:

1. A continuous air monitor for detecting Alpha emitting radionuclides comprising: (a) a detector, (b) an air gap, (c) means of measuring a deposited energy of a detected particle, (d) means of counting a number of particles detected at a given energy range, and (e) means of compensating for counts due to presence of Radon; and in which the means of compensating for counts due to presence of Radon comprises (i) means of carrying out a channel-by-channel statistical test comparing the number of particles counted over the energy range with an expected count due to Radon daughters and (ii) means of determining if any deviation from the expected count is statistically significant, so as to attribute at least some of the count to Alpha emission not due to presence of Radon.

2. A continuous air monitor as described in claim 1 further comprising means of carrying out a rolling multi-channel test to determine if an Alpha release has occurred.

3. A continuous air monitor as described in claim 1 in which the statistical test is a Currie critical limit test.

4. A continuous air monitor as described in claim 1 further comprising means of measuring and recording a predetermined total number of counts.

5. A continuous air monitor as described in claim 1 further comprising means of compensating for loss of energy of the Alpha particle across the air gap within the continuous air monitor by correcting the deposited energy in the detector according to the Bethe-Bloch equation.

6. A method of compensating for the presence of Radon gas in a continuous air monitor comprising:
   recording the energy of each detected Alpha count in one of a plurality of channels,
   carrying out a channel by channel statistical test comparing the measured count in each channel to the expected count due to Radon daughter products, and
   determining if any deviation from the expected count is statistically significant and therefore not due to the presence of Radon gas.

7. A method as set out in claim 6 further comprising carrying out a rolling multi-channel test to determine if an Alpha release has occurred.

8. A method as set out in claim 6 in which the statistical test is a Currie critical limit test.

9. A method as set out in claim 6 in which a predetermined total number of counts is measured and recorded.

10. A method as set out in claim 6 in which the deposited energy in the detector is corrected according to the Bethe-Bloch equation in order to compensate for the loss of energy of the Alpha particle across the air gap within the monitor.

* * * * *